Sept. 3, 1963
H. C. HAMONTRE
3,102,722
SELF DAMPING SHOCK AND VIBRATION MOUNT
Filed Dec. 11, 1961
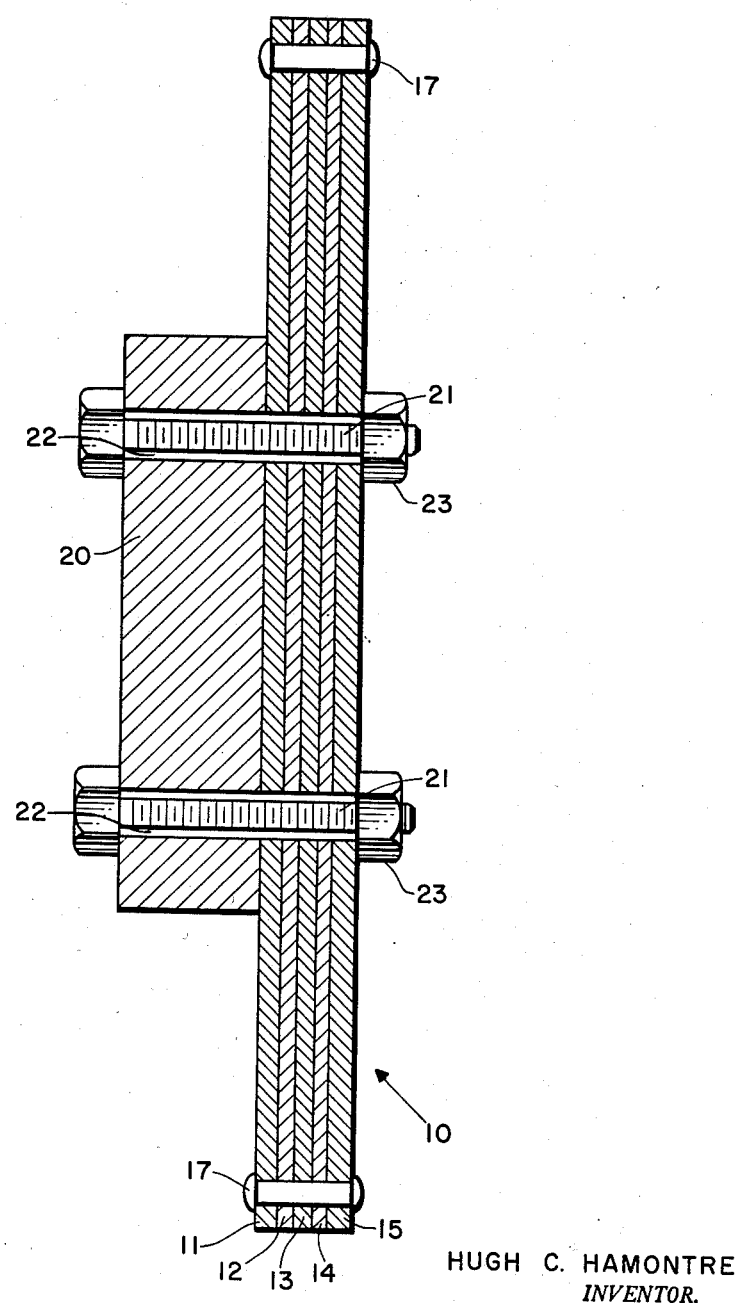
HUGH C. HAMONTRE
*INVENTOR.*
BY
*J. M. St. Amand*
*ATTORNEY*

3,102,722
SELF DAMPING SHOCK AND VIBRATION
MOUNT
Hugh C. Hamontre, Riverside, Calif., assignor to the
United States of America as represented by the Secretary of the Navy
Filed Dec. 11, 1961, Ser. No. 158,618
7 Claims. (Cl. 267—1)
(Granted under Title 35, U.S. Code (1952), sec. 266)

The invention herein described may be manufactured and used by or for the Government of the United States of America for governmental purposes without the payment of any royalties thereon or therefor.

The present invention relates to shock and vibration mounts and more particularly to a multi-leaf spring mount for electronic devices which prevents undue vibrations from being transmitted to the devices.

Previously, shock and vibration problems have been solved by using soft pads, various other spring or flexible mounts, such as suspension on wires and combinations of sheets of metal cemented together with various elastomers. The old methods for shock and vibration protection have been successful in applications where space and weight limitations, or motion of the protected component were not critical. However, in many applications where space and weight limitations are critical other types of spring mounts and pads are unsatisfactory because of their bulk or weight, or because they permit excessive motion of the components resulting in damage. Sheet metal-elastomer combinations have been successfully used in certain applications where large displacements are allowable and low temperatures prevail; however, such devices rely upon the molecular friction of the elastomer for vibrational damping and therefore are unsuitable in environments where heat will destroy the elastomer and thus cause failure of the damping protection. Furthermore, the frictional damping derived by molecular friction within an elastomer has been determinated to be much less efficient than mechanical frictional damping between two metal plates in close contact. Also, while multi-layered leaf springs are known, they are usually of equal thickness or have the same natural resonant frequency and, therefore, provide no mutual damping between plates as does the present device.

The mounting structure of the present invention employs a plurality of leaf-type springs, each one of which has a different thickness and a different natural period of vibration thereby preventing the mount from assuming a resonant condition.

It is an object of the invention, therefore, to provide a new and improved multi-layered leaf-spring shock mount.

Another object of the invention is to provide a multi-thickness leaf-spring mount which cannot assume a resonant condition.

A further object of the invention is to proivde a light weight, low bulk, high vibration damping mount operable at a wide range of temperatures.

Still another object is to provide a multi-layered spring mount in which each layer has a different period of vibration.

A still further object is to provide a new self damping shock and vibration mount.

Other objects and many of the attendant advantages of this invention will become readily appreciated as the same becomes better understood by reference to the following detailed description when considered in connection with the accompanying drawings wherein:

The FIGURE of drawing is a cross-sectional elevation of a multi-layered leaf-spring mount of the present invention showing a component package to be protected from shock and vibrations mounted thereon.

In the figure of drawing is shown a mount 10 consisting of a plurality of plates 11, 12, 13, 14 and 15 of metal of different thicknesses and randomly arranged as shown. The plates are held together structurally by a plurality of rivets 17, four for example, spaced about the structure. Each of the plates 11, 12, 13, 14 and 15 have a different resonant frequency; the difference in frequency of each plate is determined by the thickness of the plate and, therefore, the plate thickness is so chosen that its natural resonant frequency is at least 20 cycles per second different from every other plate in the structure 10. By this means each plate is damped at its natural vibrational frequency by each of the other plates which have different natural frequencies, and as a result no individual plate 11, 12, 13, 14 or 15 can go into vibrational resonance, thus eliminating the force amplification that would occur in a single sheet, or in sheets of equal thickness, when the sheet reached its natural frequency of vibration. An odd number of plates, such as 3, 5, 7, etc., are preferred to provide damping, rather than any pairs or equal number of plates that might amplify each other at some higher harmonic over the vibrational frequency range for which protection is desired.

In the present device advantage is taken of mechanical friction between plates 11, 12, 13, 14 and 15 as they slip over each other in vibration. This mechanical friction converts to heat energy the vibrational energy that would normally be transmitted by a solid plate to the components mounted thereon and thus protects the components from the destructive vibrational forces.

Another factor in the design of the present device that can be utilized for additional vibrational damping is the manner of mounting the components to be protected on the mount 10. The components 20 are mounted by means of bolts 21 inserted through clearance holes 22 in the plates and provides clamping action between the plates 11, 12, 13, 14 and 15 when the components 20 are fastened on the mount by tightening nuts 23, thus providing localized friction between the plates and thereby increasing frictional damping.

By this unique combination of principles, a shock and vibration mount can be designed using any metallic material with results varying only in degree. For instance carbon steel, stainless steel, brass, aluminum, magnesium and beryllium plates have been used with success. The only difference being in the variations of coefficient of friction between the materials used and the inherent differences in the molecular friction of the metals themselves. Magnesium and beryllium are most efficient because of their higher molecular damping factor.

The present damping system has economic advantage in that stamped flat plates can be riveted or bolted together into a large unit to maintain structural integrity, and then the unit can be cut into any shapes, machined, and holes drilled as desired.

The chief criteria is for the mount to be composed of smooth flat plates clamped in intimate contact with each other and having natural vibrational frequencies varying by at least 20 cycles per second between the plates of any given combination. Any number of plates can be used for structural strength but an odd number of plates is much more efficient than an even number in taking advantage of mis-matched natural vibrational frequencies among the various plates used for any given application.

Obviously many modifications and variations of the present invention are possible in the light of the above teachings. It is therefore to be understood that within the scope of the appended claims the invention may be practiced otherwise than as specifically described.

What is claimed is:

1. A self-damping shock and vibration mount comprising:
   (a) a plurality of flat, thin metal sheets of substantially the same flat surface size arranged in a stack,
   (b) each one of said plurality of metal sheets being of a different thickness than any of the other of said sheets,
   (c) clamping means for structurally holding said stack of metal sheets together in intimate contact with each other,
   (d) the mechanical friction between sheets when in vibration resulting in the vibrational energy being converted to heat energy thus protecting any components mounted thereon from destructive vibrational forces.

2. A self-damping shock and vibration mount comprising:
   (a) a plurality of flat, thin leaf-type springs of substantially the same flat surface size arranged to form a multilayer mount,
   (b) each one of said leaf-type springs being of a different thickness than any of the others and randomly stacked,
   (c) clamping means for structurally holding said plurality of leaf-type springs together in flat contact with each other,
   (d) each of said leaf-type springs having a different natural period of vibration thereby preventing the mount from assuming a resonant condition,
   (e) the mechanical friction between springs when in vibration resulting in the vibrational energy being converted to heat energy thus protecting any components mounted thereon from destructive vibrational forces.

3. A device as in claim 2 wherein an odd number of springs is used.

4. A device as in claim 2 wherein components being mounted thereon by means of bolts inserted through clearance holes in the mount and thereby providing additional clamping action between the different sheets when said bolts are tightened and thus increasing frictional damping.

5. A self-damping shock and vibration mount comprising:
   (a) a plurality of flat, leaf-type springs of substantially the same flat surface area arranged to form a multilayer mount,
   (b) each one of said leaf-type springs being of a different thickness than any of the others,
   (c) clamping means for structurally holding said plurality of springs together in flat close contact with each other,
   (d) each of said leaf-type springs having a different natural period of vibration thereby preventing the mount from assuming a resonant condition,
   (e) the thickness of each spring being so chosen that its natural frequency is at least 20 cycles per second different from every other spring in the mount thus preventing any individual spring from going into vibrational resonance,
   (f) the mechanical friction between springs when in vibration resulting in the vibrational energy being converted to heat energy thus protecting any components mounted thereon from destructive vibrational forces.

6. A self-damping shock and vibration mount comprising:
   (a) a plurality of smooth flat sheets of flexible materials of substantially the same flat surface area having high molecular damping factors due to the crystal structure of the material itself,
   (b) each one of said sheets having a different thickness than any of the other sheets,
   (c) said sheets randomly arranged in a stack,
   (d) clamping means structurally holding said stack of sheets together in intimate contact with each other thereby increasing the mechanical friction between the sheets,
   (e) the mechanical friction between said sheets when in vibration resulting in the vibrational energy being converted to heat energy thus protecting any components mounted thereon from destructive vibrational forces.

7. A device as in claim 6 wherein components being mounted thereon by means of bolts inserted through clearance holes in the mount and thereby providing additional clamping action between the different sheets when said bolts are tightened and thus increasing frictional damping.

References Cited in the file of this patent
UNITED STATES PATENTS

| | | |
|---|---|---|
| 628,891 | Morrill et al. | July 11, 1899 |
| 1,241,743 | Landau | Oct. 2, 1917 |
| 1,894,839 | Werner | Jan. 17, 1933 |